United States Patent [19]
Karaktin

[11] 4,449,687
[45] May 22, 1984

[54] SYSTEM AND METHOD OF MOUNTING A LAMP HOLDER ON A SUPPORT

[75] Inventor: Vincent M. Karaktin, Nassau County

[73] Assignee: Emerson Electric Co., St. Louis, Mo.

[21] Appl. No.: 308,047

[22] Filed: Oct. 2, 1981

Related U.S. Application Data

[62] Division of Ser. No. 136,435, Apr. 2, 1980, Pat. No. 4,317,164.

[51] Int. Cl.³ ................ F16B 3/00
[52] U.S. Cl. ................ 248/225.2; 403/370
[58] Field of Search .............. 248/225.2, 225.4, 316 E, 248/219.2; 211/189, 193; 403/374, 370

[56] References Cited

U.S. PATENT DOCUMENTS

| | | | |
|---|---|---|---|
| 506,388 | 10/1893 | Clark | 403/370 X |
| 612,489 | 10/1898 | Dean | 403/370 |
| 2,331,498 | 10/1943 | Otto | 403/370 X |
| 2,676,849 | 4/1954 | Houck et al. | 403/370 X |
| 2,691,541 | 10/1954 | Benedek | 403/370 |
| 4,307,672 | 12/1981 | Shikimi | 108/152 X |

FOREIGN PATENT DOCUMENTS

| | | | |
|---|---|---|---|
| 2026650 | 2/1980 | United Kingdom | 403/374 |

*Primary Examiner*—Ramon S. Britts
*Assistant Examiner*—Sarah A. Lechok
*Attorney, Agent, or Firm*—Polster, Polster and Lucchesi

[57] ABSTRACT

A system and method of mounting a lamp holder on a support in such manner that the fasteners or other securement means are hidden from view. Specifically, the system includes a pair of wedge-locking mounting brackets, one of which is secured on place on the support (e.g., on a vertical lamp post or on the outer end of a horizontal support arm) and the other of which is secured on a lamp holder (e.g., either on a horizontal lamp support arm which is to be secured to the post or on a lamp which is to be secured to the horizontal support arm) so that upon bringing the lamp holder into abutting relation with the support and upon effecting relative vertical movement between the lamp holder and the support, the former is wedgingly drawn into secure abutting relation with the latter and so that the mounting bracket is hidden from view. A method of mounting a lamp holder is also disclosed.

4 Claims, 4 Drawing Figures

SYSTEM AND METHOD OF MOUNTING A LAMP HOLDER ON A SUPPORT

This is a division of application Ser. No. 136,435, filed Apr. 2, 1980, now U.S. Pat. No. 4,317,164.

BACKGROUND OF THE INVENTION

This invention relates to a mounting system, and more particularly to such a system and method for mounting a lamp holder (e.g., either a horizontal support arm carrying the lamp holder or the lamp holder itself) to a support (e.g, a vertical lamp post, wall, or a horizontal support arm to which the lamp holder is secured).

Generally speaking, in architectural outdoor lighting applications, such as in parking lot lighting, a lighting fixture typically includes a vertical lamp post secured to a foundation and extending vertically to a desired height (e.g., 12 feet (3.6 m.) or more). A single lamp, may, in some instances, be mounted to the top of the post. In other instances, one or more lamps may be carried by the post with each lamp mounted on a horizontal support arm which is cantilevered from the vertical lamp post.

This invention is particularly concerned with a system for mounting either a horizontal support arm to a vertical lamp post, or for mounting a lamp fixture (or lamp holder) to the outer end of the horizontal support arm in such manner that the mounting system is substantially hidden from view thus resulting in a clean, aesthetic appearance for the post light. However, as will be apparent to those skilled in the art, the mounting system of this invention does have application for uses other than post light applications.

Heretofore, the support arm of a lighting fixture was affixed to the post by means of fasteners which were visible from the exterior of the post light and thus marred its appearance. Other mounting systems involve welding the support arm to the post while still other mounting systems necessitated the use of large mounting flanges or other hardware. These prior mounting systems were either relatively expensive, could not be field installed, or marred (at least to a certan degree) the appearance of the lighting fixture. Moreover, it is generally throught that a "clean" appearance of a post light (or other lighting fixture) results in a highly desirable, modern, aesthetic appearance.

Of course, outdoor post lights are exposed to high wind loads and the mounting system for the lamp holder must be able to withstand these loads together with the attendant vibrations, temperature changes, and exposure to the elements.

Among the many objects of this invention may be noted the provision of a system for mounting a support or bracket arm to a post light to a vertical lamp post (or for mounting the lamp fixture to the horizontal support arm) substantially without the use of fasteners, brackets, welds, etc., visible from the exterior of the lighting fixture;

The provision of mounting such a system which pivotally holds the members in secure abutting relationship and which satisfactorily resists loading and vibrations;

The provision of such a mounting system which is readily and quickly field installable without the necessity of special tools or skilled workmen;

The provision of such a mounting system which permits the lamp to be shipped in a "knocked down" configuration and which permits the lamp fixture to be readily field assembled and to be readily installed on a lamp post after the vertical post has been erected;

The provision of such a mounting system in which the parts are "self-locking" upon installation;

The provision of such a mounting system which uses one basic extruded metal shape for the principal parts of the mounting system;

The provision of such a mounting system which may be used to mount an object, such as a lamp support arm or bracket to any other support, such as a lamp post or a wall;

The provision of such a mounting system which does not substantially interfere with the wiring for the lamp;

The provision of such a system in which the various parts may be firmly and securely drawn into secure abutting relation with one another without the necessity of having access to the interior of any of the parts for manipulating or actuating the securement means;

The provision of such a mounting system which permits a lamp fixture to be readily disassembled for repair and maintenance; and The provision of such a mounting system which is of rugged and economical construction and which is aesthetically appealing.

Other objects and features of the present invention will be in part pointed out and in part apparent hereinafter.

SUMMARY OF THE INVENTION

Briefly stated, the mounting system of this invention has application in a lighting fixture or the like which includes a vertical support post, a support arm cantilevered secured to the vertical post and extending therefrom with at least one end of the support arm being hollow, and a lamp holder supported on the free end of the support arm. Specifically, the improvement of this invention comprises means for rigidly securing the support arm to the post (or the lamp holder to the support), the post having a mounting bracket rigidly secured to the exterior thereof with this post mounting bracket having a securement portion rigidly secured to the post. The post mounting bracket further includes a web extending generally horizontally outwardly from the securement portion and a flange extending upwardly therefrom with one face of this last said flange facing toward the post and being inclined with respect to the vertical such that its top is spaced farther from the post than its bottom. The support arm has a support mounting bracket installed internally therewithin adjacent the post. This post mounting bracket has a portion adapted to be rigidly secured to an upper wall of the support arm on inside thereof and further has a flange extending downwardly from the securement portion. One face of this last-said flange facing away from the support post is inclined with respect to the vertical so the bottom of this one flange face is closer to the post than its top. The inclined flange faces of both of said mounting brackets wedgingly cooperate with one another so that upon the support arm being brought substantially into abutting relation with the post with the post mounting bracket being received within the support arm and upon the latter being moved downwardly relative to said post, the inclined faces of these flanges wedgingly cooperate with one another so as to draw and hold the support arm in cantilever abutting relation with the post.

The method of this invention relates to rigidly cantilever coupling a horizontal support arm and a vertical post, the support arm being hollow and having at least one inner wall and an end adapted to abut the post. The method consists of securing first a mounting bracket on a vertical face of the support post, this first bracket having a coupling flange extending in generally vertical direction and being spaced from the post. Another mounting bracket is installed on the inner wall of the support arm at the abutting end of the support arm. The support arm and the post are brought into abutting relation with the abutting end of the hollow support arm receiving the mounting bracket secured to the post. Then, relative vertical movement between the post and the support arm is effected so as to result in a camming, wedging action between the coupling flanges of the brackets thereby to forcefully draw and hold the support arm in firm abutting engagement with the post.

BRIEF DESCRIPTION OF THE DRAWINGS

Corresponding reference characters indicate corresponding parts throughout the several views of the drawings.

DESCRIPTION OF PREFERRED EMBODIMENTS

Figure 1:
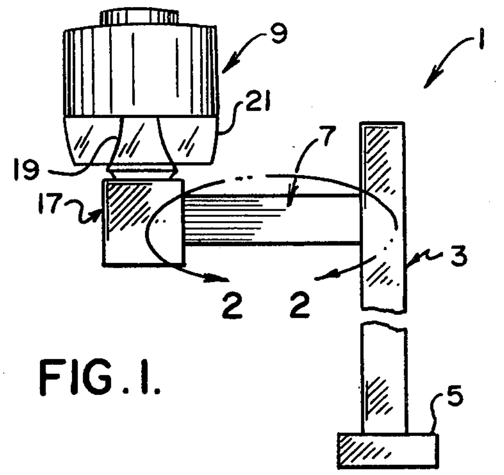
FIG. 1 is a side elevational view of a single lamp lighting fixture of the present invention in which a horizontal support arm is cantilever secured to a vertical support post by means of the securement system of the present invention.

Referring now to the drawings and specifically to FIG. 1, a post light, as is generally indicated at 1, is shown to comprise a vertical support post 3 extending upwardly from its base 5 which in turn is a adapted to be rigidly or solidly secured to a suitable foundation 5. For example, post 3 may be a hollow rectangular (i.e., a square) post of extruded aluminum or the like. As shown, a single horizontal support arm or bracket 7 is cantilevered from the upper portion of post 3 and extends horizontally outwardly therefrom. This support arm is shown to carry a lighting fixture, as is generally indicated at 9. Support arm 7 is shown in the drawings to be a hollow rectangular (i.e., a square) tube of extruded aluminum or the like. As shown, the support arm is generally the same size as post 3 and, in FIG. 2, is shown to have a top or upper wall 11, a bottom wall 13, and side walls 15*a* and 15*b* (see FIG. 3).

Light fixture 9 is shown to be a commercially available light fixture, such as is manufactured and sold by McPhilben Lighting, Emerson Electric Co. of Melville, N.Y. As shown, fixture 9 includes a vertical lamp holder 17 in which a suitable lamp (e.g., an incandescent, metal halide, or sodium vapor lamp) is mounted. A reflecting cone 19 is provided as well as a suitable transparent enclosure lense 21.

Figure 2:
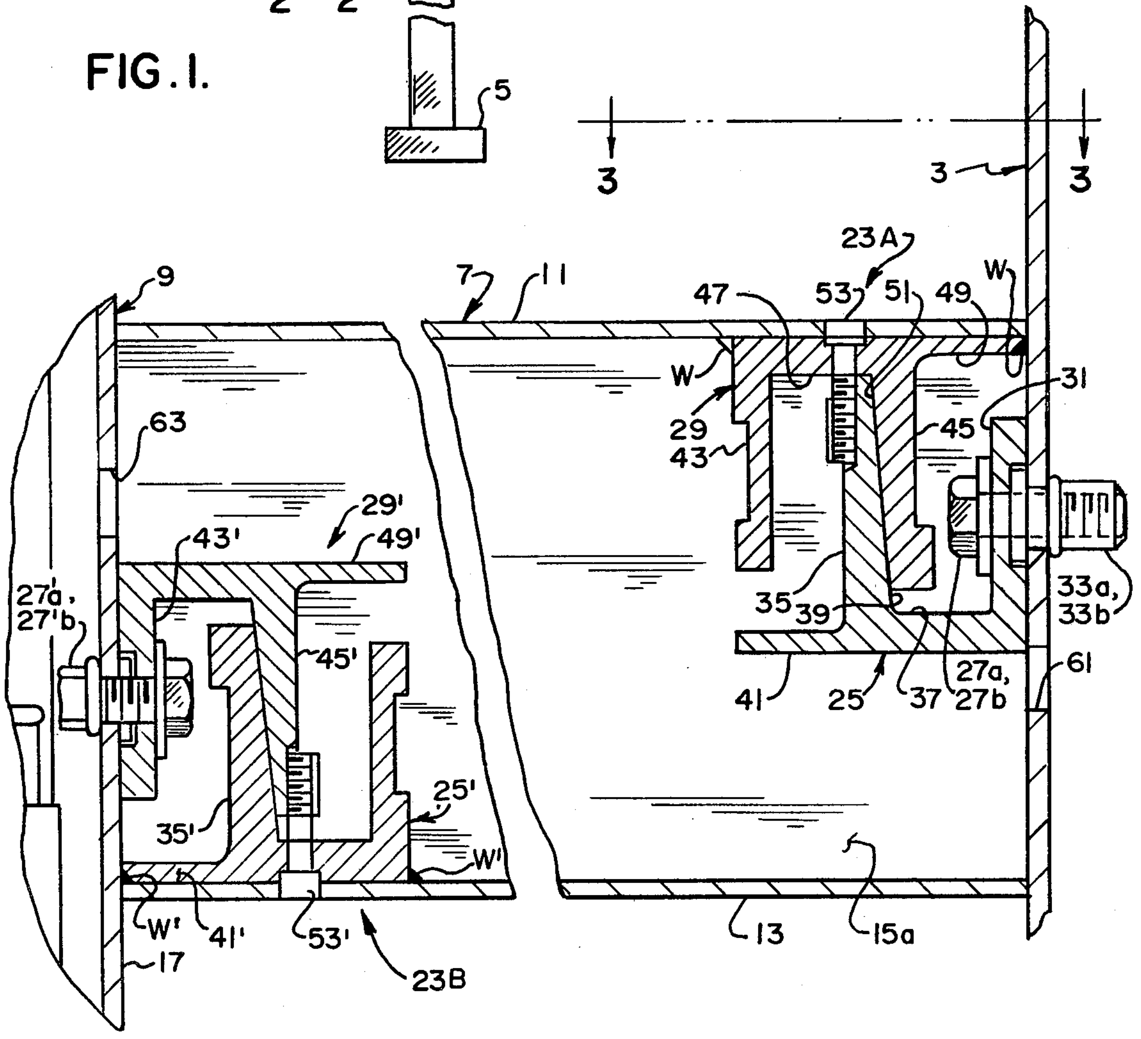
FIG. 2 is a greatly enlarged sectional view of a portion of a lighting fixture taken along line 2—2 of FIG. 1 illustrating the securement system of this invention for mounting the lamp holder to a support.
Figure 3:
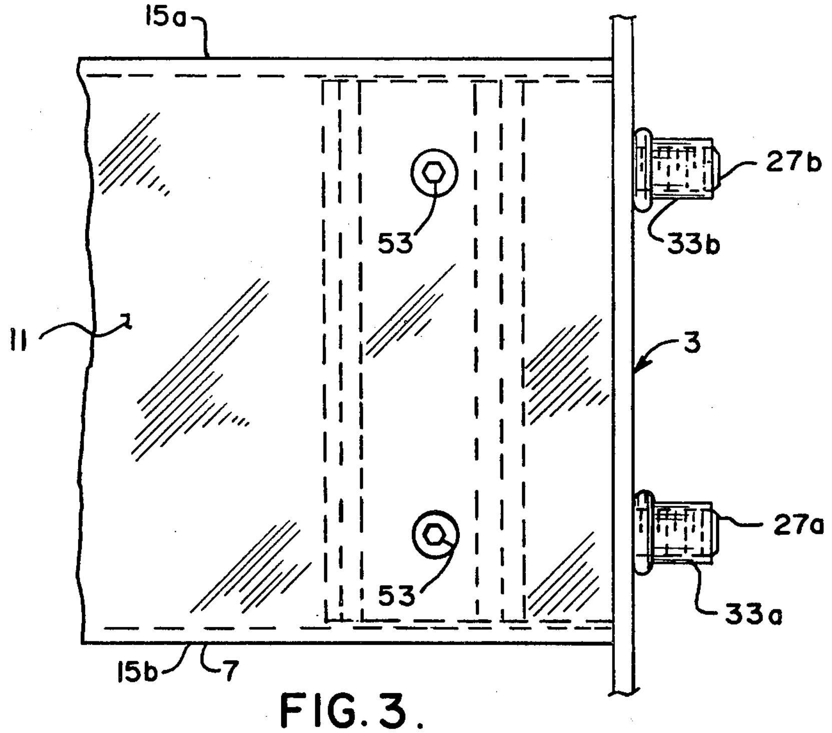
FIG. 3 is a view taken along line 3—3 of FIG. 2 illustrating a portion of the support arm in top plan view.

In accordance with this invention and as shown best in FIG. 2, two mounting systems 23A, 23B of this invention are utilized to respectively mount support arm 7 to post 3 and to mount lamp fixture 9 to the outer or free end of the support arm. Generally, these mounting systems are substantially identical and thus only mounting system 23A will be described in detail at this time and differences between the two systems will be pointed out hereinafter.

Mounting system 23A is shown to comprise a first mounting bracket 25 secured to one vertical face of post 3 by means of bolts 27*a*, 27*b*. A second mounting bracket is indicated at 29 and is secured (e.g., welded) to the inner face of top wall 11 of support arm 7 at the end thereof adjacent the post. Bracket 25 is an integral one-piece member, preferably extruded of a suitable metal alloy, such as aluminum or the like. This bracket is generally U-shaped in cross section and it has a mounting flange 31 adapted to abut a vertical surface of post 3 (or of another mounting support member). Bolts 27*a*, 27*b* extend through respective holes in mounting flange 31 and have respective nuts 33*a*, 33*b* threaded thereon. In certain applications where access to nuts 33*a*, 33*b* is difficult or impossible, any one of a number of well known blind fasteners may be used in place of bolts 27*a*, 27*b* so as to secure bracket 25 in place on the vertical post. Mounting bracket 25 further includes a so-called coupling flange 35 with a web 37 interconnecting flanges 31 and 35. As shown in FIG. 2, the channel-shaped mounting bracket 25 is so oriented that the free edges of flanges 31 and 35 extend upwardly. Coupling flange 35 has an inclined face 39 which faces towards post 3 and which is inclined with respect to the vertical so that its top is farther from post 3 than its bottom. As indicated at 41, an extension of web 37 extends out beyond flange 35 for purposes as will appear. Of course, it will be appreciated that bracket 25 is of such width as to be received in the open end of hollow support arm 7 between side walls 15*a*, 15*b*.

Preferrably, but not necessarily, mounting flange 29 is made from the same extrusion as bracket 25. Thus, bracket 29 has a first flange 43 corresponding to flange 31 of bracket 25, a coupling flange 45 corresponding to flange 35, a web 47 corresponding to web 37, and a web extension 49 corresponding to web extension 41. Bracket 29 is preferably made of an alloy compatible with support arm 7 so that the bracket may be welded, as indicated at W, to the inner face of top wall 11 of support arm 7 with its web 47 with engagement with wall 11 and with the free end of its web extension 49 flush with the end of upper wall 11 which abuts post 3 thereby to properly space flange 45 of bracket 29 in relation to flange 35 of bracket 25. With bracket 29 so secured to support arm 7, the inclined face 51 of coupling flange 45 faces away from post 3 toward the inclined face 39 of coupling flange 35 and is inclined with respect to the vertical such that its bottom (i.e., its free end) is closer to post 3 than its top.

Figure 4:
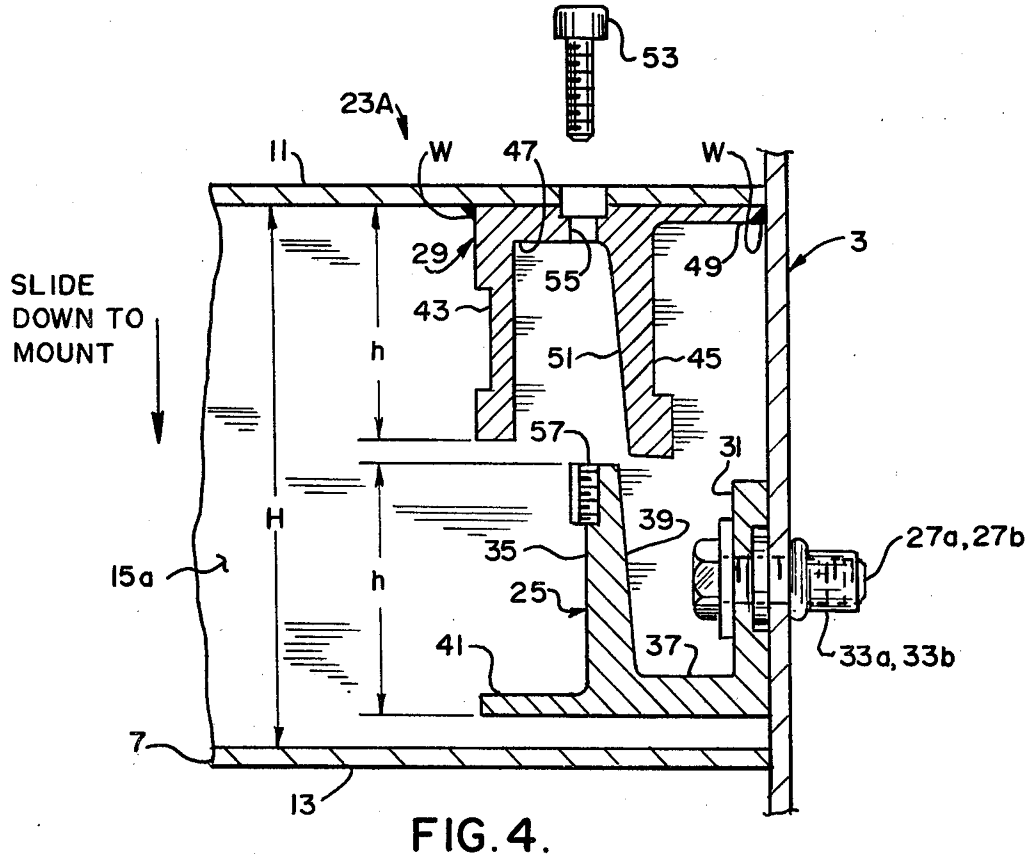
FIG. 4 is a view generally similar to FIG. 2 showing the relation of the support arm to the lamp post prior to securement of these members relative to one another by the securement system of the present invention.

As shown in FIG. 4, the distance between the upper and bottom walls 11 and 13 of wall support arm 7 is indicated at H, and the height of brackets 25 and 29 is indicated by h. In accordance with this invention, height h of the brackets is less than half of the height H of the support arm so as to enable the support arm to be installed on post 3 with its end abutting the post and with bracket 25 received with the hollow arm below bracket 29. By effecting relative vertical movement between the support arm and the post as by sliding the support arm downwardly on the post, coupling flange 45 of bracket 29 is disposed between coupling flange 35 and post 3 with their respective inclined faces 39 and 51 facing one another. These inclined faces are adapted to cammingly or wedgingly engage one another upon further relative vertical movement of the support arm and the post and thus will positively force or draw the end of support arm 7 into firm abutting engagement with post 3. It will be appreciated that with the coupling flanges 35 or 45 in wedging or cantilevered engagement with one another, additional downward force on the support arm will serve to even more firmly draw the ends of support arm into abutting engagement with the post and thus the mounting system of this invention is said to be "self-locking".

As indicated at 53, cap bolts or other removable fasteners are preferably inserted into a respective counterbored hole 55 in upper wall 11 and in flange 47 of bracket 29 and into respective threaded bores 57 in the upper edge of flange 35 of bracket 25 after installation of support arm on post 3 thereby to positively hold the support arm in place. It will be appreciated that bolts 53 do not carry any appreciable load but rather prevent support arm 7 from being lifted upwardly with respect to post 3.

It is observed that bracket 25 is installed on post 3 with its web 37 at its bottom and bracket 29 is installed on top wall 11 of support arm 7 with its web 47 facing upwardly. The weight and other forces acting on support arm 7 are resisted by the interengagement of the inclined coupling faces 39 and 51 of coupling flanges 35 and 45 and by the edge of bottom wall 13 of support arm 7 bearing against vertical post 3. Also, because brackets 25 and 29 extend horizontally substantially the width between side walls 15*a*, 15*b* of support arm 7, the interengagement of the coupling flanges also satisfactorily withstands side forces applied to the support arm.

A wire passthrough hole 61 (see FIG. 2) is provided in post 3 below bracket 25 and a similar hole 63 is provided in lamp holder post 17 above bracket 25' so as to permit a wire (not shown) supplying power to the lamp to be routed through the hollow support arm 7.

Turning now to mounting system 23B shown in FIG. 2, it will be appreciated that it is substantially similar to mounting system 23A heretofore described having a first support mounting bracket 25' and a lamp holder mounting bracket 29'. It will be understood that in mounting system 23B, the "primed" reference characters indicate parts having similar construction and function as the parts described heretofore in mounting system 23A. In particular, in system 23B, bracket 25' is analogous in function to bracket 25 in system 23A and bracket 29' is analogous to bracket 29. It will, however, be appreciated that support bracket 25' is secured (e.g., welded) to the inner surface of bottom wall 13 of support arm 7 at the free end thereof with the end web extension 41' flush with the outer end of the support arm so as to accurately locate this bracket with respect to the end of the support arm and with respect to lamp holder mounting bracket 29'.

While mounting system 23A has been herein described for mounting support arm 7 on post 3, it will be understood that system 23A may be employed to mount the support arm on any vertical surface, such as a wall or the like, and the term support post is herein defined to include any vertical surface on which the support arm is to be mounted.

To mount fixture 9 on support arm 7, lamp holder bracket 29' is inserted in the outer or free end of arm 7 with the lower end of coupling flange 45' above the upper edge of coupling flange 35' of support bracket 25' and with the outer end of support arm 7 abutting lamp holder 17. Then, the latter is moved down relative to support arm 7, and coupling flanges 35' and 45' wedgingly cooperate to forcefully draw and hold the lamp holder on the free end of the support arm.

As described above, the mounting system of this invention was described in conjunction with a post lamp. It will, however, be appreciated that within the broader aspect of this invention generally the mounting system of this invention may be utilized to secure any member to any other member and into face abutting relation. Additionally, it will be appreciated that support arm 7 need not be hollow but rather it may only need a hollow cavity at its end for receiving and hiding the mounting brackets. Also, it will be appreciated that support arm 7 need not be rectangular in cross section but by appropriate shaping of the mounting brackets may be of any desired cross section.

While the method of this invention of rigidly cantilevered coupling a horizontal support arm to a vertical post is believed clear from the above description, the method of this invention will be specifically described and pointed out in relation with the structure heretofore described. Specifically, the method comprises securing a mounting bracket 25 on a vertical face of a support or post 3. This mounting bracket has a coupling flange 35 extending vertically upwardly which is spaced from the vertical post 3. Next, a mounting bracket 29 is secured on the inner face of the upper wall 11 of the horizontal support arm 7. This last-mentioned bracket has a coupling flange 45 extending downwardly and is spaced inwardly of the end of the support arm which abuts the vertical post. Next, the support arm and the post are brought into abutting relation one another with the end of the support arm receiving mounting bracket 25 secured to the vertical post. Then, relative vertical movement between the support arm and the post is effected so as to result in a camming or wedging action between the inclined faces 39 and 51 of the coupling flanges of brackets 25 and 29 so as to forcefully draw the support arm into firm abutting engagement with vertical face of the post.

In view of the above, it will be seen that the several objects of this invention are achieved and other advantageous results obtained.

As various changes could be made in the above constructions and method without departing from the scope of the invention, it is intended that all matter contained in the above description and shown in the accompanying drawing shall be interpreted as illustrative and not in a limiting sense.

I claim:

1. A system for mounting a member to a support, said system including a member, a support and a pair of mounting brackets, one mounting bracket mounted on the member and the other mounting bracket mounted on the support, said brackets being of a common extrusion, each of said brackets having a coupling flange, one of said pair of brackets being installed on said support with its coupling flange extending in one direction, the other of said pair of brackets being secured to said member with its coupling flange extending in another direction opposite said one direction, said coupling flanges being so arranged relative to one another so that upon said member and said support being brought into relative abutting relation, said coupling flanges are wedgingly engageable with one another as said member and said support are moved relative to one another in opposite directions so as to wedgingly draw and to hold said member in secure abutting relation on said support.

2. A mounting system as set forth in claim 1 further including a removable fastener interconnecting said member bracket and said coupling flange of said support mounting bracket thereby to positively prevent the removal of said member from said support.

3. A mounting system as set forth in claim 1 wherein said member is horizontally disposed and is hollow having an upper and a lower wall, and wherein with a mounting bracket secured on the inside of the upper wall of said support arm with its coupling flange extending downwardly, the length of said coupling flange from its free end to said upper wall is less than one half the distance between the upper and lower walls of said hollow support arm.

4. The method of rigidly cantilever coupling a horizontal support arm and a vertical member, said support arm being hollow and having at least one inner wall and an end adapted to abut said post, said method comprising the steps of:

securing a mounting bracket to a vertical face of said vertical member, said bracket having a coupling flange extending in generally vertical direction and being spaced from said vertical member;

securing a mounting bracket on the inner face of a wall of said support arm, this last said bracket having a coupling flange extending in a general vertical direction and being spaced inwardly of said abutting end of said support arm, said coupling flanges of said mounting brackets each having a tapered, vertical wedge face with the wedge faces of said mounting brackets being wedgingly engageable with one another;

bringing said support arm and said vertical member into abutting relation with said abutting end of said hollow support arm receiving said mounting bracket secured to said vertical member; and vertically moving said support arm relative to said vertical member so as to result in a camming, wedging action between wedge faces of said coupling flanges of said brackets thereby to forcefully draw and hold said support arm and said vertical member in firm abutting engagement with one another.

* * * * *